United States Patent
Biermann et al.

(10) Patent No.: US 8,480,532 B2
(45) Date of Patent: Jul. 9, 2013

(54) SPUR GEAR DIFFERENTIAL

(75) Inventors: Thorsten Biermann, Wachenroth (DE);
Bernd-Robert Hohn, Munich (DE);
Franz Kurth, Ismaning (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 216 days.

(21) Appl. No.: 13/133,750

(22) PCT Filed: Jun. 24, 2010

(86) PCT No.: PCT/EP2010/059023
§ 371 (c)(1),
(2), (4) Date: Jun. 9, 2011

(87) PCT Pub. No.: WO2011/003747
PCT Pub. Date: Jan. 13, 2011

(65) Prior Publication Data
US 2011/0245012 A1  Oct. 6, 2011

(30) Foreign Application Priority Data
Jul. 9, 2009  (DE) .......................... 10 2009 032 286

(51) Int. Cl.
*F16H 48/10*  (2012.01)
*F16H 57/08*  (2006.01)

(52) U.S. Cl.
USPC .......................................... 475/252; 475/344

(58) Field of Classification Search
USPC .......................................... 475/248, 252, 344
See application file for complete search history.

(56) References Cited

U.S. PATENT DOCUMENTS

| 5,658,214 A * | 8/1997 | Hofstetter et al. ............. 475/249 |
| 5,976,051 A * | 11/1999 | Madsack et al. ............... 475/252 |
| 2005/0020401 A1* | 1/2005 | Ando et al. .................... 475/344 |

FOREIGN PATENT DOCUMENTS

| DE | 102004015278 | 10/2005 |
| DE | 102006019131 | 11/2007 |
| WO | 9212361 | 7/1992 |

OTHER PUBLICATIONS

Fronius, Dr. S., Chapter 6, "Design of Driving Elements", Verlag Technik Berlin, 1982.
Zirpke, K., "Gearwheels", VEB Fachbuchverlag Leipzig, 11 edition.

* cited by examiner

*Primary Examiner* — Edwin A Young
(74) *Attorney, Agent, or Firm* — Volpe and Koenig, P.C.

(57) ABSTRACT

A spur gear differential (1) having a first sun (3) and a second sun (5), wherein the first sun (3) is associated with a first set of planetary gears (7) and the second sun (5) is associated with a second set of planetary gears (9), and the first set of planetary gears (7) engages with the second set of planetary gears (9). The number of teeth (11) of the first sun (3) are equal to the number of teeth (12) of the second sun (5), and the teeth (11) of the first sun (3) are disposed by a profile shift on a crown circle (2) having a crown circle diameter ($D_{K1}$) that differs from the crown circle diameter ($D_{K2}$) of a crown circle on which the teeth (12) of the second sun (5) are disposed. The first set of planetary gears (7) engages only with the first sun (3) and the second set of planetary gears (9) engages only with the second sun (5).

15 Claims, 6 Drawing Sheets

SPUR GEAR DIFFERENTIAL

FIELD OF THE INVENTION

A spur gear differential with a first sun and a second sun, wherein a first set of planet gears is associated with the first sun and a second set of planet gears is associated with the second sun and the first set of planet gears meshes with the second set of planet gears and here the number of teeth of the first sun equals the number of teeth of the second sun, wherein, through profile displacement, the teeth of the first sun are arranged on a crown circle with a crown-circle diameter that is different than the crown-circle diameter of a crown circle on which the teeth of the second sun are arranged, wherein the first set of planet gears meshes with only the first sun and wherein the second set of planet gears meshes with only the second sun.

BACKGROUND

DE 10 2004 015 278 A1 shows a differential gear for the driving of two coaxial, rotating shafts in which the gear housing coaxial to the shafts is driven in a rotating manner by, for example, a toothed belt. The differential gear is a spur gear transmission.

A spur gear differential or transmission is a transmission like a kind of planetary gearing in which the compensation elements engaging with each other via teeth are gearwheels with spur teeth.

The spur gear differential of the class-forming type is provided with a first sun and a second sun. A first set of planet gears is associated with the first sun and a second set of planet gears is associated with the second sun, wherein they are all spur gears. The first set of planet gears meshes with the second set of planet gears.

In DE 10 2006 019 131 B4, a distributor gear with differential is described in which the differential is a bevel gear differential and the downstream active axle gear is a planetary gear with a first sun and a second sun. A first set of planet gears is associated with the first sun and a second set of planet gears is associated with the second sun. The number of teeth of the first sun is equal to the number of the second sun. An active-yaw function of the branches is achieved by the effective diameter ratio of the first teeth to the second teeth. Initially, a different tooth count is proposed as the simple average that is, however, actually complicated to estimate. Alternatively, the same tooth count of the two sets of teeth is also proposed, wherein then by means of a profile displacement, the necessary transmission ratio is provided between the second gearwheel that is coupled with the side shaft and the first gearwheel coupled with the differential housing.

The profile displacement is a measure known to someone skilled in the art by which teeth for various operating conditions can be produced, for example, with the same tools [Dr. S. Fronius, Chapter 6, "Design of driving elements," Verlag Technik Berlin, 1982].

The tooth profile of a spur gear is initially unambiguously defined by the reference profile and its position relative to the reference circle. The reference circle is a mathematical parameter and a circle that is perpendicular to the axis of the gearwheel and whose circumference is the product from the tooth count and the reference circle pitch. The reference circle pitch is a circular arc lying on the reference circle from one tooth center to another tooth center and is a multiple of $\pi$, so that the reference circle $D_0$ is finally produced from the product from the modulus and the tooth count. The modulus m is the ratio of the pitch $\rho$ to $\pi$, $m=\rho/\pi$. In the technical world, the reference circle $D_0$ is also named the base circle or generating pitch circle.

Pitch circles are the imaginary circles of the gearwheels about the axis of each gearwheel, wherein these pitch circles contact at the pitch point and roll on each other there, without sliding relative to each other [see also K. Zirpke, "Gearwheels," VEB Fachbuchverlag Leipzig, 11th edition]. In other words, in this case, the two tooth flanks of the gearwheels in meshing contact transfer the rotational movement at a constant transmission ratio when their shared contact normal always goes through the pitch point. The pitch circles of such meshed parts of gearwheels are the reference circles (O-wheels).

The pitch-circle diameters of the paired wheels (diameters of the working pitch circles) could alternatively by larger or smaller than their reference-circle diameters (V-wheels). A fundamental quantity for defining the teeth is thus the radial distance of the profile reference line from the pitch point lying on the reference circle.

Therefore, the already mentioned O-wheels and V-wheels are distinguished according to the position of the profile reference line of the reference profile to the reference circle. For 0-wheels, the profile reference line forms a tangent to the reference circle. For V-wheels, the profile reference line does not form a tangent to the reference circle, but instead lies outside of the reference circle in the radial direction or intersects it at two points.

The radial distance (in millimeters) of the profile center line from the pitch point is designated as the profile displacement. The numerical value of the profile displacement for modulus 1 is designated as the profile displacement factor x and is given from the ratio of the profile displacement to the modulus. In other words, the quantity of the profile displacement is expressed with the factor x in fractions of the modulus (xm), the profile displacement divided by the modulus. For a positive profile displacement, the profile reference line lies outside of the reference circle. For a negative profile displacement, the profile reference line intersects the reference circle.

SUMMARY

The invention is based on the objective of creating a spur gear differential that has a reduced axial installation space and simultaneously makes possible a reduction of the weight of the entire spur gear differential.

The above problem is solved by a spur gear differential that comprises the features of the invention and another independent claim.

The spur gear differential of the present invention has a first sun (first sun gear) and a second sun (second sun gear). A first set of planet gears is associated with the first sun and a second set of planet gears is associated with the second sun.

The first set of planet gears meshes with the second set of planet gears. The teeth of the planet gears of the first set are wider than the teeth of the planet gears of the second set, because the teeth of the first set engage simultaneously with the first sun and with the planet gears of the second set and the planet gears of the second set engage simultaneously with the second sun.

The number of teeth of the first sun is equal to the number of teeth of the second sun. Because the first set of planet gears meshes with the second set of planet gears and each of the suns meshes with one of the sets of planet gears, the teeth of the sun gears are produced with extreme profile displacement so that a collision of the individual teeth with each other is not produced.

With the same tooth counts z and the same modulus m, the teeth of the sun gears are produced with different profile displacements such that the teeth of the planet set with the wider teeth do not engage with the sun that meshes with only the planet gears with the narrower teeth. This is achieved through displacement of the tooth profile of the teeth of each sun with respect to the base circle of its respective teeth. In other words, the distance between the teeth of the gearwheels of the first set to the teeth of the second sun is achieved through displacement of the tooth profile of the teeth of each sun with respect to the base circle of its respective teeth.

According to the invention, the crown-circle diameter of the crown circle of the teeth of the first sun is realized by positive profile displacement and the crown-circle diameter of the crown circle of the teeth of the second sun is realized by negative profile displacement.

The crown circle surrounds the teeth for spur gears on the tooth crown and the crown-circle diameter is accordingly the outer diameter of the teeth and defines the radial spatial requirements of the gearwheel.

According to the definition of the profile displacement in the section "Background of the Invention," the profile reference line lies in rolling contact on the first sun through positive profile displacement outside of the reference circle. The profile reference line in rolling contact on the second sun intersects the reference circle at two points due to the negative profile displacement.

The distance of the engagement of the suns to the planet gears of each set was produced with different forms with profile displacement and thus also the distance of the gearwheel axis of the sun to each gearwheel of the set with which the respective sun meshes—wherein, however, the distances of the gearwheels of one set to the associated sun are equal.

Constructions of the invention provide:

The profile displacement factor $x_1$ of the first sun is greater than the numerical value 1 and advantageously lies in the range from 1< to 1.5.

The profile displacement factor $x_2$ of the second sun is less than the numerical value 1 and advantageously lies in the range 1> to 0.7.

The absolute value (absolute quantity) designated as the total profile displacement factor $x_g$ of the differences of possible profile displacement factors of teeth of the first sun and second sun is $\geq$ the numerical value 1.6 and advantageously lies in the range 2 to 2.2 on the basis of the following calculation:

$$x_g = |x_1 - x_2|.$$

The crown-circle diameter of the crown circle of one of the suns is less than the root-circle diameter of the root circle of the other sun. The root circle of one set of spur teeth is the imaginary circle on which the teeth are arranged, where the tooth roots transition at the tooth gaps into the solid material of the cylindrical part of the gearwheel. Accordingly, the root-circle diameter is defined by a difference of crown-circle diameter minus twice the tooth height of the teeth in the radial direction: $D_F = D_K - 2 \times H$.

The number of teeth of the planet gears of the planet sets is advantageously within the respective planet set and also equal for the planet gears of both planet sets—as an alternative, however, it could also be different. This also relates to the crown-circle diameter designated as the teeth diameter, root-circle diameter, and reference-circle diameter of the planet gears of one set and the sets relative to each other.

The spur gear differential could be constructed as a spur gear differential with straight teeth.

Likewise, it is possible to construct the spur gear differential as spur gear differential with oblique teeth.

The suns of the spur gear differential have different crown-gear diameters, so that, for the assembly of the spur gear differential, for example, the teeth region of the planet gears with the larger axle distance can be pulled away above the sun with the smaller crown-circle diameter.

Another independent claim of the invention provides a spur gear differential with a first sun and a second sun in which a first set of planet gears is associated with the first sun and a second set of planet gears is associated with the second sun. The first set of planet gears meshes with the second set of planet gears. The number of teeth of the first sun is equal to the number of teeth of the second sun. Through profile displacement, the teeth of the first sun are arranged on a crown-circle diameter that is different than the crown-circle diameter on which the teeth of the second sun are arranged. The planet gears are supported so that they can rotate on at least one shared frame. In addition, a crown gear with spur teeth is mounted on the sun.

The reference circle of the teeth of the crown gear of the spur teeth is arranged concentric to the reference circles of the suns. The crown gear is the driving element (power input into the differential) of the spur gear differential that engages by via teeth, for example, with an output pinion of a drive motor or is connected to this output pinion by a toothed belt.

Constructions of the invention provide:

The crown gear advantageously encompasses the planet sets on the outside in the radial direction.

Both sets of planet gears are supported together on two frame sections of the frame that lie opposite each other in the axial direction and take the planet sets between.

The suns and the planet sets are encapsulated by the frame, i.e., by the two frame sections.

Alternatively, the suns and the planet sets and the suns are encapsulated by the frame and by the crown gear, wherein the crown gear is a ring-shaped component that encompasses the planet sets and the suns peripherally on the outside.

The two sections of the frame that take the planet sets between them are directly fastened to each other in the axial direction.

Alternatively, the frame sections take the crown gear between them in the axial direction and are fastened to this crown gear, so that the connection elements, such as grooves and screws, simultaneously connect and hold the crown gear and the frame sections to each other.

The hub-shaped sections have regions that are flattened on the ends and with which the frame sections contact each other longitudinally on the ends.

Fastening sections projecting inward from the crown gear in the radial direction are fastened to the frame sections.

BRIEF DESCRIPTION OF THE DRAWINGS

The invention will be explained in detail below with reference to embodiments. Shown are.

DETAILED DESCRIPTION OF THE PREFERRED EMBODIMENTS

For elements of the invention that are identical or have identical actions, identical reference symbols are used. Furthermore, for the sake of clarity, only reference symbols that are required for the description of each figure are shown in the individual figures. The shown embodiments represent merely examples for how the device according to the invention could be equipped. They do not represent a conclusive limitation of the invention.

Figure 1:
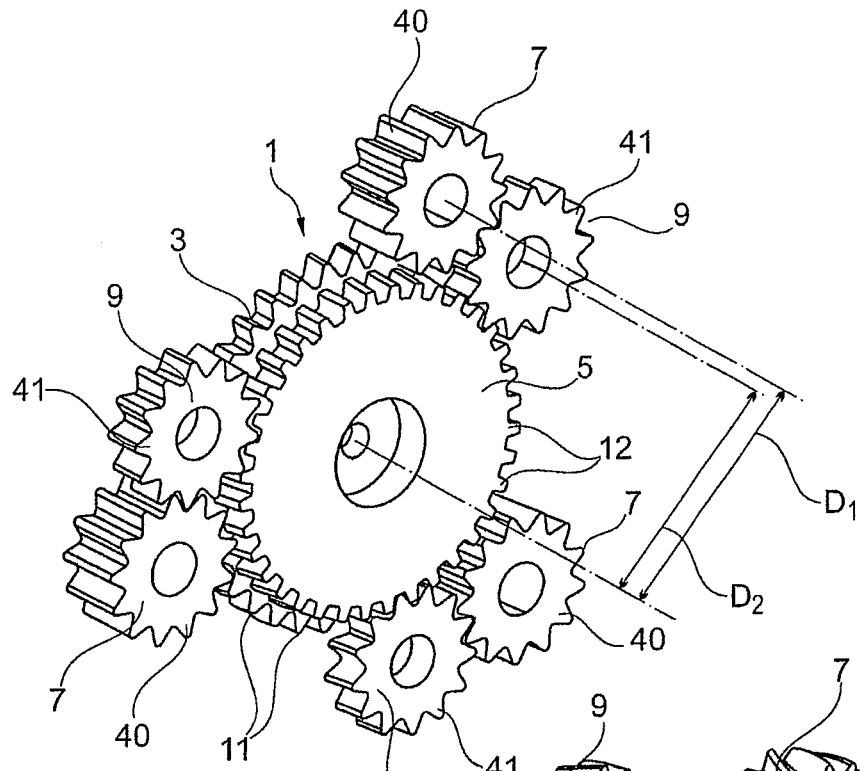
FIG. 1 is a perspective view of straight-toothed planet gears and suns in an arrangement according to the invention.

FIG. 1—FIG. 1 shows a schematic, perspective view of the interior of a spur gear differential that is not otherwise further shown with straight-toothed gearwheels 3, 5, 7 and 9 according to the invention. A first set of planet gears 7 is associated with the first sun 3, with these planet gears engaging with this sun. Likewise, a second set of planet gears 9 is associated with the second sun 5, with these planet gears engaging with this sun. The teeth 40 of the first planet set 7 are approximately twice as wide as the teeth 41 of the planet gears 9 of the second set. The first set of planet gears 7 meshes with the second set of planet gears 9.

Figure 2:
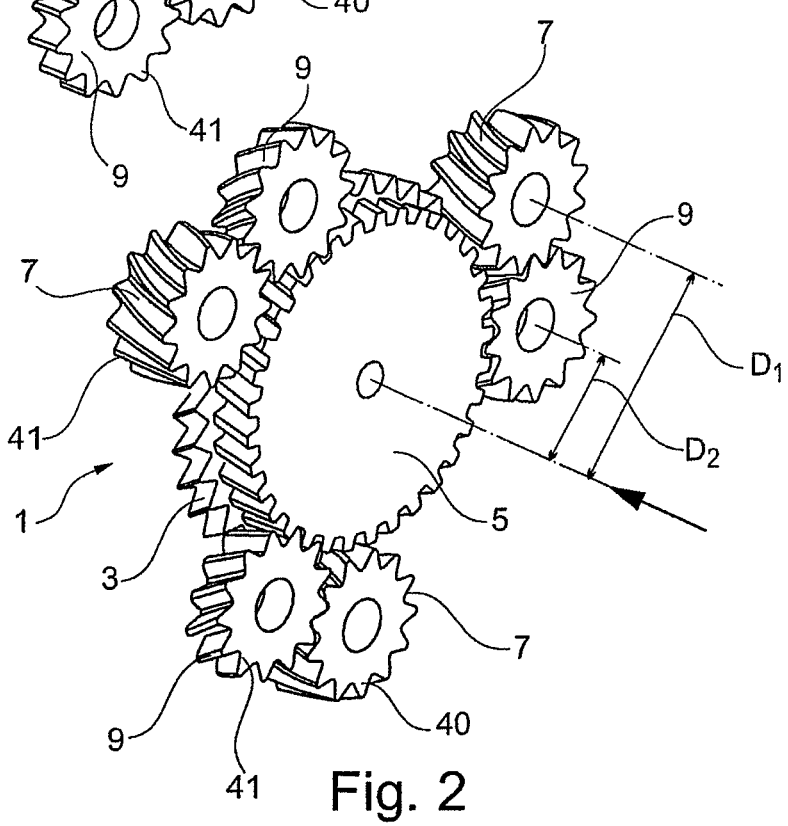
FIG. 2 is a perspective view of oblique-toothed planet gears and suns in an arrangement according to the invention.
Figure 4:
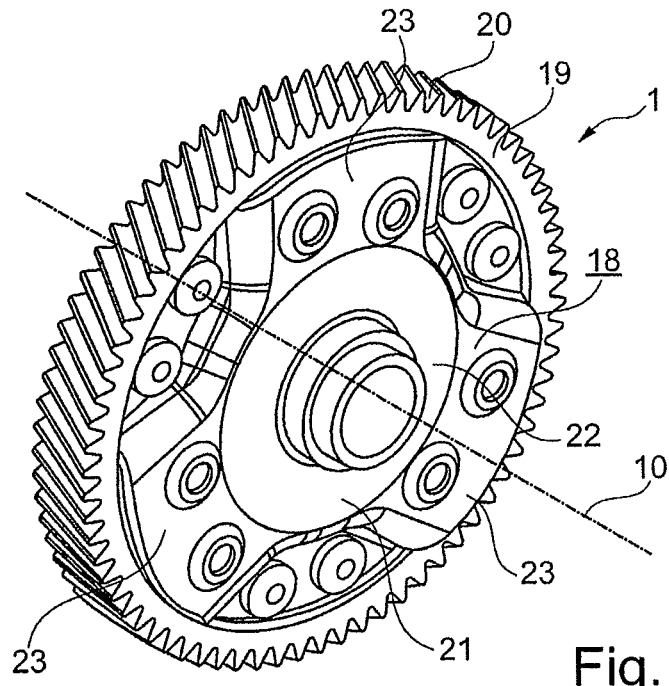
FIG. 4 is an overall view of an embodiment of a differential whose spur gears are arranged according to the principle described in FIG. 3d.

FIG. 2—FIG. 2 shows a schematic, perspective view of the interior of the spur gear differential 1 according to FIG. 4. A first set of planet gears 7 is associated with the first sun 3, with these planet gears engaging with this sun. Likewise, a second set of planet gears 9 is associated with the second sun 5, with these planet gears engaging with this sun. The teeth 40 of the first planet set 7 are approximately twice as wide as the teeth 41 of the planet gears 9 of the second set. The first set of planet gears 7 meshes with the second set of planet gears 9.

Figure 3A:
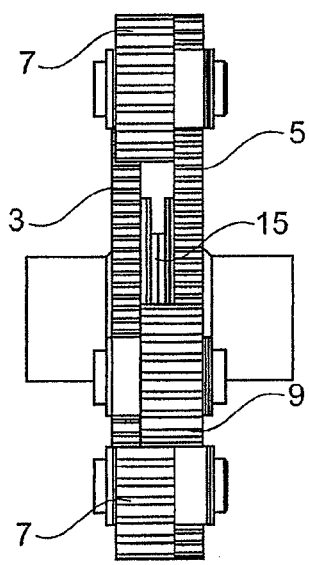
FIG. 3a is a schematic view showing the setup of straight-toothed planet gears and suns in an arrangement according to the prior art.
Figure 3B:
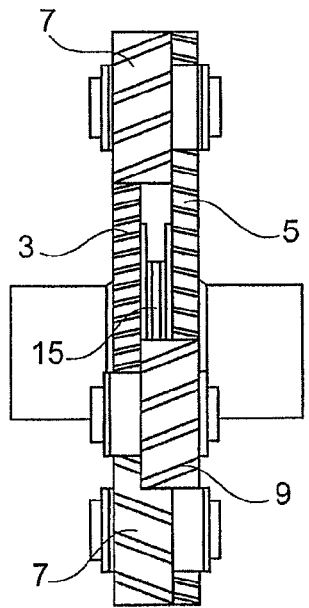
FIG. 3b is a schematic view showing the setup of oblique-toothed planet gears and suns in an arrangement according to the prior art.

FIGS. 3a and 3b—FIGS. 3a and 3b each show the arrangement of gearwheels 3, 5, 7 and 9 in spur gear differentials according to the prior art that are otherwise not shown further. In the embodiment shown in FIG. 3a, all of the gearwheels 3, 5, 7 and 9 have straight teeth. In the embodiment shown in FIG. 3b, all of the gearwheels 3, 5, 7 and 9 have oblique teeth. The suns 3 and 5 have the same diameter and the same tooth geometry relative to each other. Here, the first sun 3 and the second sun 5 are spaced far apart from each other such that the first set of planet gears 7 does not overlap into the region of the second sun 5. Likewise, the second set of planet gears 9 is constructed such that it does not overlap into the region of the first sun 3. Through these arrangements, the first sun 3 and the second sun 5 must be at a large enough distance from each other in the axial direction or the planet gears are designed accordingly narrow. With this arrangement, if comparable torques are to be transferred with respect to the arrangements according to the invention from FIGS. 3c and 3d, the differential must be constructed considerably wider. The distance of the first sun 3 and the second sun 5 relative to each other is thus detrimental to a compact construction of the spur gear differential 1. The first sun 3 and the second sun 5 are spaced apart from each other by a spacing disk or friction disk 15.

Figure 3C:
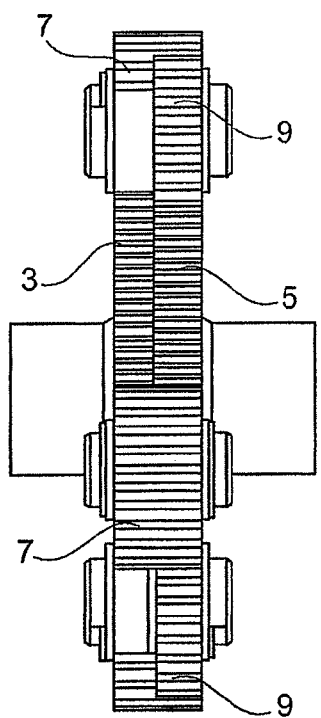
FIG. 3c is a schematic view showing the setup of straight-toothed planet gears and suns in an arrangement according to the invention.
Figure 3D:
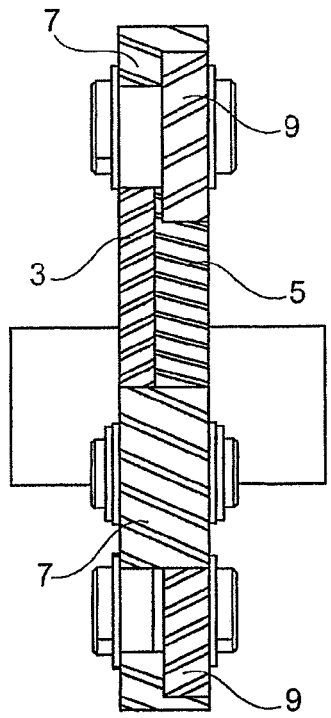
FIG. 3d is a schematic view showing the setup of oblique-toothed planet gears and suns in an arrangement according to the invention.

FIGS. 3c and 3d—FIG. 3c shows the arrangement according to the invention of straight-toothed gearwheels 3, 5, 7 and 9 in a spur gear differential not otherwise shown in more detail. FIG. 3d shows schematically the arrangement of the gearwheels 3, 5, 7 and 9 with oblique teeth of the spur gear differential 1 according to the invention shown in FIG. 4 and other figures, which was also already described with FIG. 2. The first sun 3 and the second sun 5 are barely spaced apart from each other in the embodiment according to the invention, because the suns have different diameters relative to each other.

Figure 11:
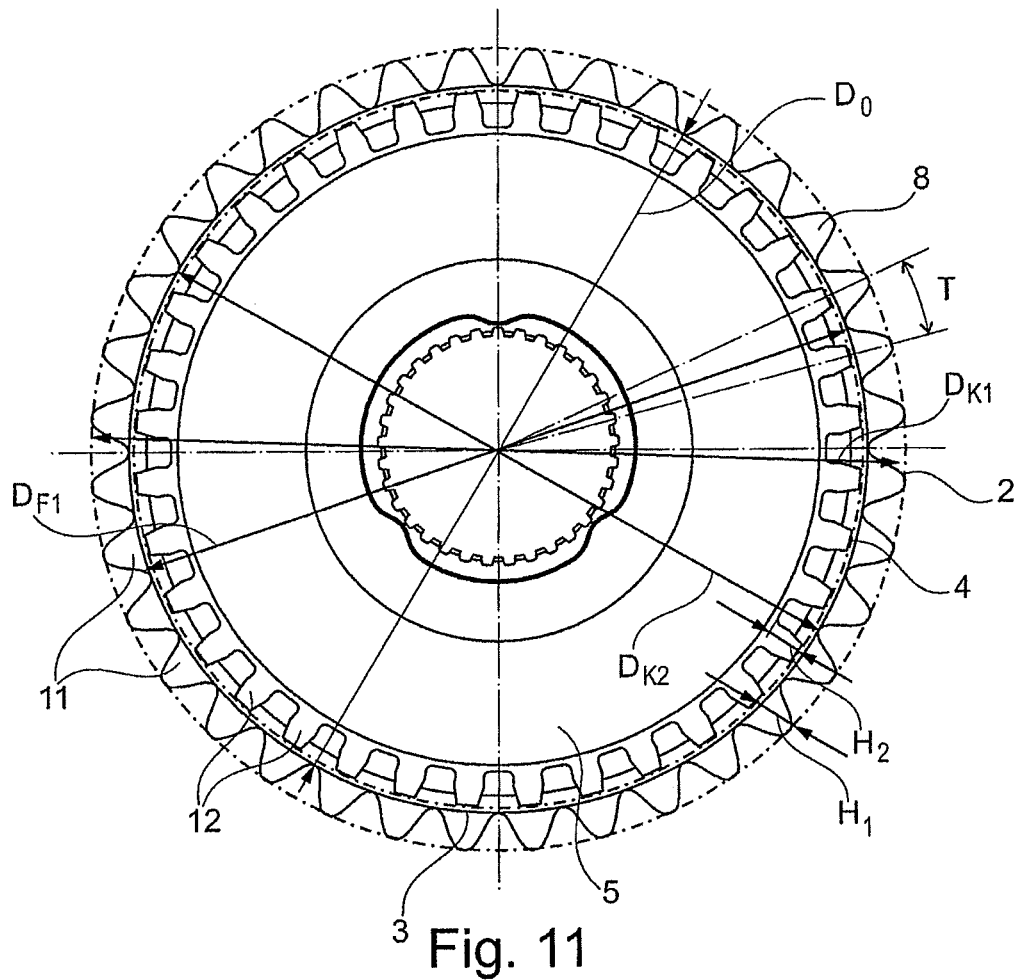
FIG. 11 is a view of the suns of the spur gear differential as individual parts arranged one after the other in a direction of the directional arrow according to FIG. 2 or FIG. 6.

FIG. 11—FIG. 11 shows the suns 3 and 5 of the spur gear differential arranged one behind the other as individual parts in a view with direction of the directional arrow according to FIG. 2. The number $z_1$ of teeth 11 of the first sun 3 is equal to the number $z_2$ of teeth 12 of the second sun 5 that is, in this case, thirty-six with equal pitch T=10×36 on teeth distributed 360° on the periphery. Through profile displacement, the teeth 11 of the first sun 3 are arranged on a crown circle 2 with the crown-circle diameter $D_{K1}$ that has a different size than a crown-circle diameter $D_{K2}$ of the crown circle 4 on which the teeth 12 of the second sun 5 are arranged. The crown-circle diameter $D_{K1}$ of the teeth 11 of the first sun 3 is realized by positive profile displacement and the crown-circle diameter $D_{K2}$ of the teeth 12 of the second sun 5 is realized by negative profile displacement. In addition, the crown-circle diameter $D_{K2}$ of the crown circle 4 of the second sun 5 is less than the root-circle diameter $D_{F1}$ of the root circle 8 of the first sun 3. The root circle 8 with the root-circle diameter $D_{F1}$ of the teeth 11 of the first sun 3 that have the tooth height $H_1$ is shown in FIG. 11 only on one-fourth of the circle for the sake of better clarity. The crown-circle diameter $D_{K2}$ of the crown circle 4 of the teeth 12 of the second sun 5 that have the tooth height $H_2$ is indeed shown in FIG. 11 essentially equal with the reference-circle diameter $D_0$ of the reference circle 6, but could also actually be smaller than this.

Figure 5:
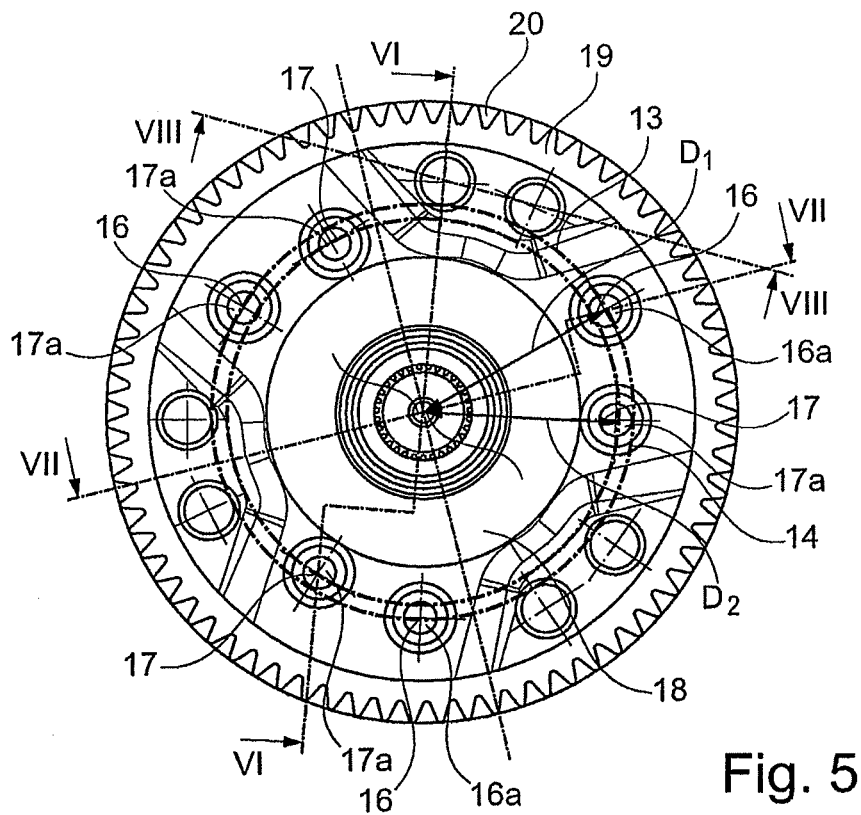
FIG. 5 is a front view of the spur gear differential according to FIG. 4 from which the profiles of the sections for the sectional representations of the following figures can be understood.

FIGS. 1 and 2—Although the planet gears 7 of the first set mesh with the first sun 3 and also with the planet gears 9 of the second set and simultaneously the planet gears 9 of the second set mesh with the second sun 5, and although the teeth 40 of the planet gears 7 also extend into the region of the teeth 41 of the second planet gears 9, and although the planet gears 7 and 9 have the same radial dimensions, and although the suns 3 and 5 have the same teeth counts, due to the described displacement of the crown-circle diameters $D_{K1}$ and $D_{K2}$ there is no contact of the teeth of the planet gears 7 of the first set with the second sun 5. So that, however, the teeth 41 of the planet gears 9 of the second set can mesh with the teeth 12 of the second sun 5, according to the invention the radial distance of the planet gears 9 to the second sun 5 was adapted as described below:

FIG. 5—The planet gears 7 of the first set covered by the sheet of a frame section 18 in FIG. 5 revolve together on an imaginary circular orbit 13 with the radius $D_1$ whose center point lies on the central axis 8 of the spur gear differential 1. The similarly covered planetary gears 9 of the second set revolve together on an imaginary circular orbit 14 with the radius $D_2$ whose center point lies on the central axis 8 of the spur gear differential 1. The orbit 13 intersects the rotational axes 16 of the planet gears 7 of the first set running perpendicular to the plane of the figure and the orbit 14 intersects the rotational axes 17 of the planet gears 9 of the second set running perpendicular to the plane of the figure. The rotational axes 16 correspond to the axes of symmetry of the planet pins 16a and the rotational axes 17 correspond to the axes of symmetry of the planet pins 17a. The radius $D_1$ of the first set of the planet gears 7 is greater than the radius $D_2$ of the second set of the planet gears 9 and, indeed, in the radial direction by the amount by which the crown-circle radii $D_1$ and $D_2$ were changed relative to each other by the total profile displacement of the suns.

FIGS. 4 and 5—FIG. 4 shows an overall view of an embodiment of the invention in the form of a spur gear differential 1 from one side with a view of a frame section 18 and a crown gear 19 with oblique teeth 20. Also to be seen in FIGS. 4 and 5 are an axial molding 21 of the frame section 18 with a central, hub-shaped section 22 and with three additional spoke-shaped sections 23. The sections 23 are arranged with equal spacing relative to each other on the periphery and run spoke-like in the radial direction from the hub-shaped section 22 to the edge of the frame section 18.

Figure 9:
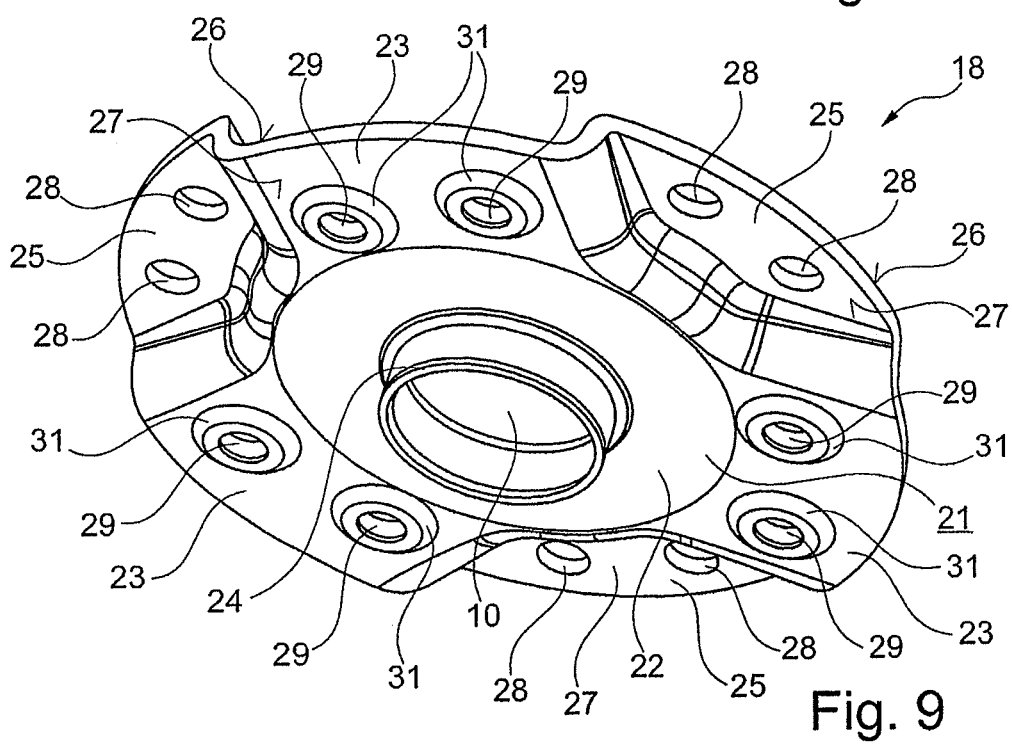
FIG. 9 is a perspective view a housing or frame section of the spur gear differential as an individual part.

FIG. 9—FIG. 9 shows the frame section 18 as an individual part. The frame section 18 is a cold-formed component made from sheet steel. A hollow-cylindrical guide collar 24 projects concentric to the central axis 10 from the hub-shaped section 22 of the axial molding 21. The spoke-shaped sections 23 are separated from each other by flat regions 25 whose parallel side faces 26 and 27 pointing in opposite axial directions each lie together in a radial plane. The flat regions 25 each have two passage holes 28. In the spoke-shaped sections 23, hole-shaped receptacles 29 are formed that each have an edge 31 on the ends.

Figure 6:
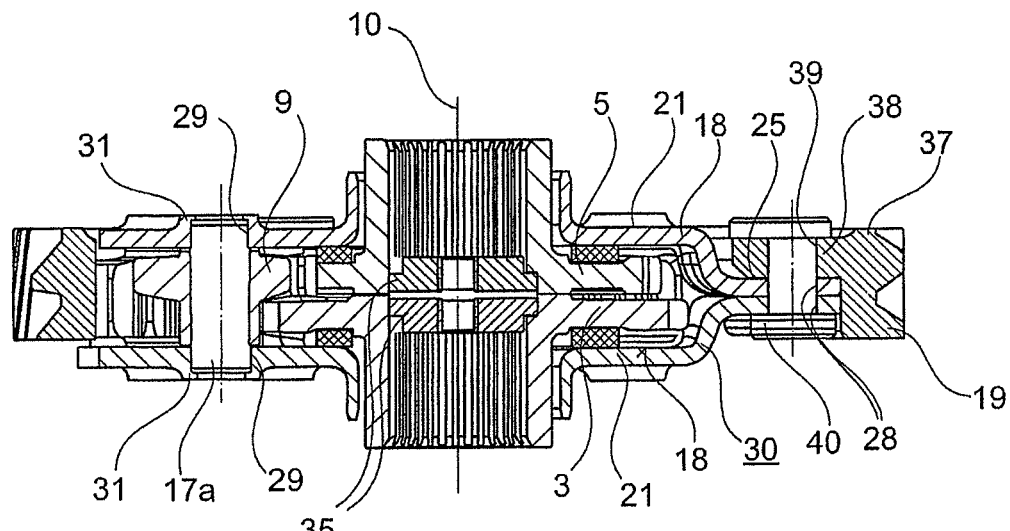
FIG. 6 is a cross-sectional representation of the spur gear differential according to FIG. 4 along the line VI-VI in FIG. 5.
Figure 7:
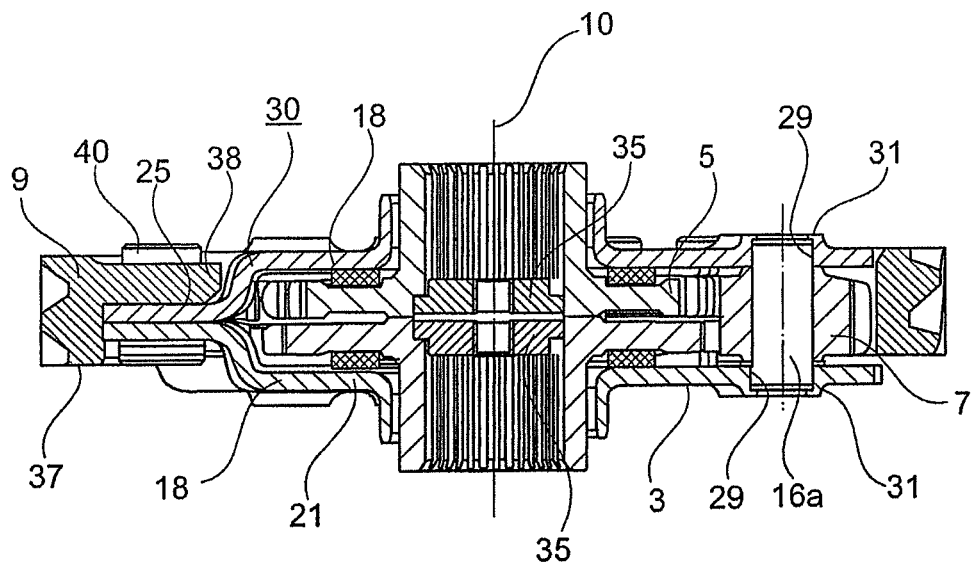
FIG. 7 is a cross-sectional representation of the spur gear differential according to FIG. 4 along the line VII-VII in FIG. 5.

FIGS. 6 and 7—As follows from FIGS. 6 and 7, the spur gear differential 1 has two of the frame sections 18 that contact each other in the axial direction with the side surfaces 26 of the flat regions 25 and thus together form a frame 30. The moldings 21 of both frame sections 18 form a housing by which the suns 3 and 5 and the sets of planet gears 7 and 9 are partially encapsulated.

Figure 12:
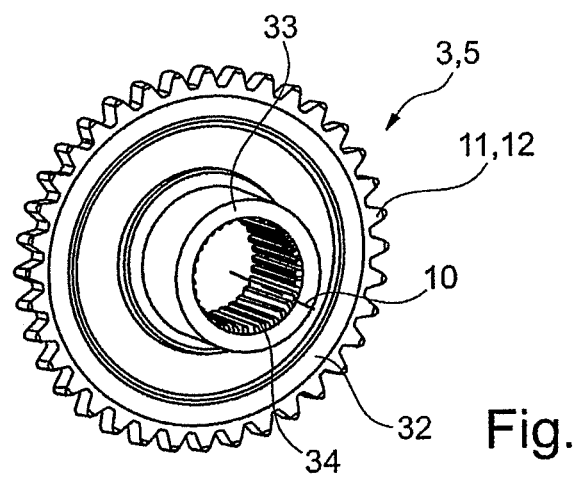
FIG. 12 is a perspective view of one of the suns of the spur gear differential according to FIG. 4.

FIG. 12—FIG. 12 shows, as an example, a sun 3 or 5 that is formed from a radial disk 32 with the teeth 11 or 12 and from a cylindrical guide section 33 that is oriented concentric to the central axis 10 and in the axial direction. The guide section 33 has teeth on the inside, for example, with channel teeth 34.

FIGS. 6 and 7—The first sun 3 and the second sun 5 are arranged one next to the other on the central axis 10 in the axial direction and have this axis as the rotational axis. At the axial separating point between the suns 3 and 5, two axial disks 35 are held in the suns 3 and 5. The axial disks are axial stops for not-shown plug-in axles.

The first set of planet gears 7 (FIG. 7) is associated with the first sun 3 and the second set of planet gears 9 (FIG. 6) is associated with the second sun 5. The planet gears 7 and 9 are supported on the shared frame 30 so that they can rotate about planet pins 16a and 17a, respectively. The planet pins 16 and 17a, respectively, are held in the receptacles 29 and secured in the axial direction by the edges 31.

Figure 10:
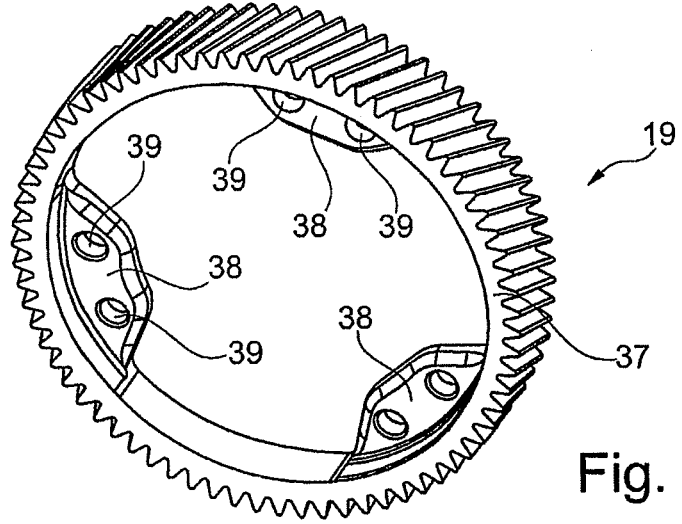
FIG. 10 is a perspective view of the crown gear of the spur gear differential according to FIG. 4.

FIG. 10—FIG. 10 shows the crown gear 19 as an individual part. The crown gear 19 is formed from a ring gear 37 and from bracket-shaped fastening sections 38 projecting inward from the ring gear 37, wherein these sections have holes 39. The hole pattern of the holes 39 matches the hole pattern of the passage holes 28 on the frame section 19 according to FIG. 9.

Figure 8:
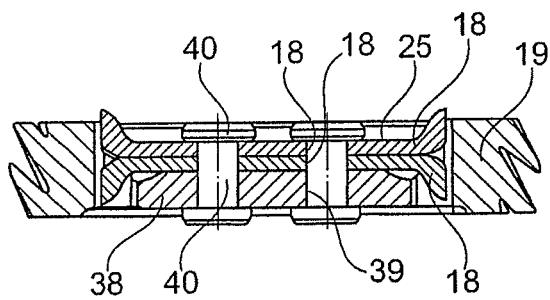
FIG. 8 is a cross-sectional representation of the spur gear differential according to FIG. 4 along the line VIII-VIII in FIG. 5.

FIGS. 6, 7 and 8—The crown gear 19 is fastened to the frame 30 concentric to the central axis 10 so that the ring gear 37 of the crown gear 19 comprises the frame sections 18 on the outside on the peripheral side. The fastening sections 38 contact the frame sections 18, more precisely the regions 25, and are fastened to these with rivets 40 that could alternatively also be screw connections. The rivets 40 each penetrate the passage holes 28 and the hole 39 and thus simultaneously hold together the unit made from gearwheels 3, 5, 7 and 9, as well as the frame 30.

| | Reference symbols |
|---|---|
| 1 | Spur gear differential |
| 2 | Crown circle of the first sun |
| 3 | First sun |
| 4 | Crown circle of the second sun |
| 5 | Second sun |
| 6 | Reference circle |
| 7 | First set of planet gears |
| 8 | Root circle of the first sun |
| 9 | Second set of planet gears |
| 10 | Central axis of spur gear differential |
| 11 | Teeth of first sun |
| 12 | Teeth of second sun |
| 13 | Orbit of planets of first set |
| 14 | Orbit of planets of second set |
| 15 | Friction disk |
| 16 | Rotational axis of planet gear of first set |
| 16a | Planet pin |
| 17 | Rotational axis of planet gear of second set |
| 17a | Planet pin |
| 18 | Frame section |
| 19 | Crown gear |
| 20 | Oblique teeth |
| 21 | Axial molding of the frame section |
| 22 | Hub-shaped section of the molding |
| 23 | Spoke-shaped section of the molding |
| 24 | Guide collar |
| 25 | Flat region |
| 26 | Side face |
| 27 | Side face |
| 28 | Passage hole |
| 29 | Receptacle |
| 30 | Frame |
| 31 | Edge |
| 32 | Disk |
| 33 | Guide section |
| 34 | Channel teeth |
| 35 | Axial disk |
| 36 | Not assigned |
| 37 | Ring gear |
| 38 | Fastening section |
| 39 | Hole |
| 40 | Tooth of planet gear 7 |
| 41 | Tooth of planet gear 9 |

The invention claimed is:

1. Spur gear differential comprising a first sun and a second sun, a first set of planet gears is associated with the first sun and a second set of planet gears is associated with the second sun and the first set of planet gears meshes with the second set of planet gears and a number of teeth of the first sun equals a number of teeth of the second sun, wherein, through profile displacement, the teeth of the first sun are arranged on a crown circle with a crown-circle diameter that is different than a crown-circle diameter ($D_{K2}$) of a crown circle on which the teeth of the second sun are arranged, the first set of planet gears meshes with only the first sun and the second set of planet gears meshes with only the second sun, and the crown-circle diameter ($D_{K1}$) of the crown circle of the teeth of the first sun is realized by positive profile displacement and the crown-circle diameter ($D_{K2}$) of the crown circle of the teeth of the second sun is realized by negative profile displacement.

2. Spur gear differential according to claim 1, wherein a profile displacement factor of the first sun is greater than a numerical value of 0.8.

3. Spur gear differential according to claim 1, wherein a profile displacement factor of the second sun is less than a numerical value of −0.8.

4. Spur gear differential according to claim 1, wherein an absolute value of a difference of possible profile displacement factors of the teeth of the first sun and the second sun is at least a numerical value of 1.6.

5. Spur gear differential according to claim 4, wherein the crown-circle diameter of one of the first and second suns is smaller than a root-circle diameter ($D_{F1}$) of the other sun.

6. Spur gear differential according to claim 1, wherein the planet gears have teeth diameters equal to each other.

7. Spur gear differential according to claim 1, wherein the spur gear differential has straight teeth.

8. Spur gear differential according to claim 1, wherein the spur gear differential has oblique teeth.

9. Spur gear differential according to claim 1, wherein teeth of the planet gears of the first set are wider than teeth of the planet gear of the second set.

10. Spur gear differential comprising a first sun and a second sun, a first set of planet gears is associated with the first sun and a second set of planet gears is associated with the second sun and the first set of planet gears meshes with the second set of planet gears and a number of teeth of the first sun equals a number of teeth of the second sun, wherein, through profile displacement, the teeth of the first sun are arranged on a crown circle with a crown-circle diameter ($D_{K1}$) that is different than a crown-circle diameter ($D_{K2}$) of a crown circle on which the teeth of the second sun are arranged, the planet gears of both sets are supported for rotation on at least one shared frame and a crown gear is fastened to the shared frame.

11. Spur gear differential according to claim 10, wherein both of the sets of planet gears are supported together on two frame sections of the frame, wherein the sets of planet gears are arranged between the frame sections and are supported on both sides in the frame sections.

12. Spur gear differential according to claim 11, wherein the planet gears of the sets and the suns are encapsulated at least partially by the frame sections.

13. Spur gear differential according to claim 11, wherein the frame sections are fastened directly to each other.

14. Spur gear differential according to claim 13, wherein the frame sections have regions that are flattened on end faces thereof and with which the frame sections contact each other longitudinally on the end faces.

15. Spur gear differential according to claim 13, wherein fastening sections project inwardly from the crown gear in a radial direction and contact and are fastened to the frame sections in the radial direction.

\* \* \* \* \*